US012506673B2

(12) United States Patent
Palanisamy (10) Patent No.: US 12,506,673 B2
(45) Date of Patent: Dec. 23, 2025

(54) SYSTEM AND METHOD FOR MEASURING AND MANAGING LATENCY ON A COMPUTER NETWORK

(71) Applicant: Sandvine Corporation, Waterloo (CA)

(72) Inventor: Anuram Palanisamy, Coimbatore (IN)

( * ) Notice: Subject to any disclaimer, the term of this patent is extended or adjusted under 35 U.S.C. 154(b) by 16 days.

(21) Appl. No.: 18/533,534

(22) Filed: Dec. 8, 2023

(65) Prior Publication Data

US 2024/0195720 A1 Jun. 13, 2024

(30) Foreign Application Priority Data

Dec. 9, 2022 (IN) ............................. 202211071114

(51) Int. Cl.
*H04L 43/0864* (2022.01)
*H04L 43/062* (2022.01)
*H04L 43/16* (2022.01)
*H04L 47/122* (2022.01)

(52) U.S. Cl.
CPC ........ *H04L 43/0864* (2013.01); *H04L 43/062* (2013.01); *H04L 43/16* (2013.01); *H04L 47/122* (2013.01)

(58) Field of Classification Search
CPC ... H04L 43/0864; H04L 43/062; H04L 43/16; H04L 47/122; H04L 43/026; H04L 47/196; H04L 47/2416; H04L 43/0852
See application file for complete search history.

(56) References Cited

U.S. PATENT DOCUMENTS

| | | | | |
|---|---|---|---|---|
| 9,432,274 B1 * | 8/2016 | Peon | ...................... | H04L 1/1835 |
| 10,122,606 B1 * | 11/2018 | Korhonen | ............... | H04L 43/08 |
| 2022/0329508 A1 * | 10/2022 | Joch | .................... | H04L 43/0882 |
| 2024/0098007 A1 * | 3/2024 | Lee | ........................ | H04L 43/106 |

FOREIGN PATENT DOCUMENTS

WO WO-2021242154 A1 * 12/2021 ......... H04L 43/0864

* cited by examiner

*Primary Examiner* — Philip C Lee
(74) *Attorney, Agent, or Firm* — Amarok IP Inc.; Neil W. Henderson (57) ABSTRACT

A system and a method for measuring latency on a computer network. The method including: identifying a QUIC traffic flow; determining packet parameters associated with the QUIC traffic flow; determining a handshake latency associated with the packet parameters; and monitoring mid-flow latency for any changes in the latency of the QUIC traffic flow. The system for measuring and managing latency on a computer network including: a data processing engine configured to determine a QUIC traffic flow; a data collection module configured to determine packet parameters associated with the QUIC traffic flow; a state machine configured to determine a handshake latency associated with the packet parameters and monitor mid-flow latency for any changes in the latency of the QUIC traffic flow.

14 Claims, 5 Drawing Sheets

SYSTEM AND METHOD FOR MEASURING AND MANAGING LATENCY ON A COMPUTER NETWORK

RELATED APPLICATIONS

The present disclosure claims priority to Indian Patent Application No. 202211071114 filed Dec. 9, 2022, which is hereby incorporated herein in its entirety.

FIELD

The present disclosure relates generally to handling of computer network traffic. More particularly, the present disclosure relates to a system and method for measuring and managing latency on a computer network.

BACKGROUND

The Internet uses various protocols to transport traffic from a sender to a receiver. These protocols may be occasionally updated and changed. Recently, a new standard, Internet Engineering Task Force (IETF) QUIC (QUIC is not an acronym), has been introduced.

After introduction of IETF QUIC in 2021, at least a portion of internet traffic has been seen shifting to IETF QUIC. IETF QUIC uses User Datagram Protocol (UDP) instead of Transmission Control Protocol (TCP) for transport layer protocol. TCP is known for sequence number and its acknowledgement. Conventionally, this data has been used to calculate accurate latency for a connection. Since applications are migrating to IETF QUIC and QUIC is an application layer protocol above UDP, this same type of data is not available in UDP.

As such, there is a need for an improved system and method for measuring and monitoring latency on a computer network and, in particular, on a computer network using IETF QUIC.

The above information is presented only to assist with an understanding of the present disclosure. No determination has been made, and no assertion is made, as to whether any of the above might be applicable as prior art with regard to the present disclosure.

SUMMARY

In a first aspect, there is provided a method for measuring and managing latency on a computer network including: identifying a QUIC traffic flow; determining packet parameters associated with the QUIC traffic flow; determining a handshake latency associated with the packet parameters; and monitoring mid-flow latency for any changes in the latency of the QUIC traffic flow.

In some cases, the packet parameters may include: the sender of the flow, the direction of the flow, and the size of the packet.

In some cases, monitoring mid-flow latency may include: determining a type of packet for a packet in the QUI traffic flow; for a data packet determining an associated ACK packet; and correlating the data packet with the associated ACK packet to determine a mid-flow latency.

In some cases, the ACK packet is determined when a packet has a layer 5 payload less than a predetermined threshold or approximately 90 bytes.

In some cases, the method may further include: determining a full Maximum Transmission Unit (MTU) for the traffic flow; and determining whether a packet is a full MTU sized packet to determine if the packet is a data packet.

In some cases, an end of stream packet size is determined when a plurality of full MTU sized packets is followed by a packet of less than full MTU size.

In some cases, the method may further include: providing a traffic action to the QUIC traffic flow if the mid-flow latency exceeds a predetermined threshold.

In some cases, the QUIC traffic flow is an IETF QUIC traffic flow.

In another aspect there is provided a system for measuring and managing latency on a computer network including: a data processing engine configured to determine a QUIC traffic flow; a data collection module configured to determine packet parameters associated with the QUIC traffic flow; a state machine configured to determine a handshake latency associated with the packet parameters and monitor mid-flow latency for any changes in the latency of the QUIC traffic flow.

In some cases, the data collection module may be configured to determine packet parameters comprising: the sender of the flow, the direction of the flow, and the size of the packet.

In some cases, the state machine may be configured to: determine a type of packet for a packet in the QUI traffic flow; for a data packet determine an associated ACK packet; and correlate the data packet with the associated ACK packet to determine a mid-flow latency.

In some cases, the ACK packet may be determined when a packet has a layer 5 payload less than a predetermined threshold or approximately 90 bytes.

In some cases, the system may further include a packet behavior identification module configured to: determine a full Maximum Transmission Unit (MTU) for the traffic flow; and determine whether a packet is a full MTU sized packet to determine if the packet is a data packet.

In some cases, an end of stream packet size may be determined when a plurality of full MTU sized packets is followed by a packet of less than full MTU size.

In some cases, the state machine may be further configured to provide a traffic action to the QUIC traffic flow if the mid-flow latency exceeds a predetermined threshold.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, the present disclosure provides a method and system for measuring and managing latency. The system is configured to measure and manage latency and in particular latency in a QUIC traffic flow.

Figure 1:
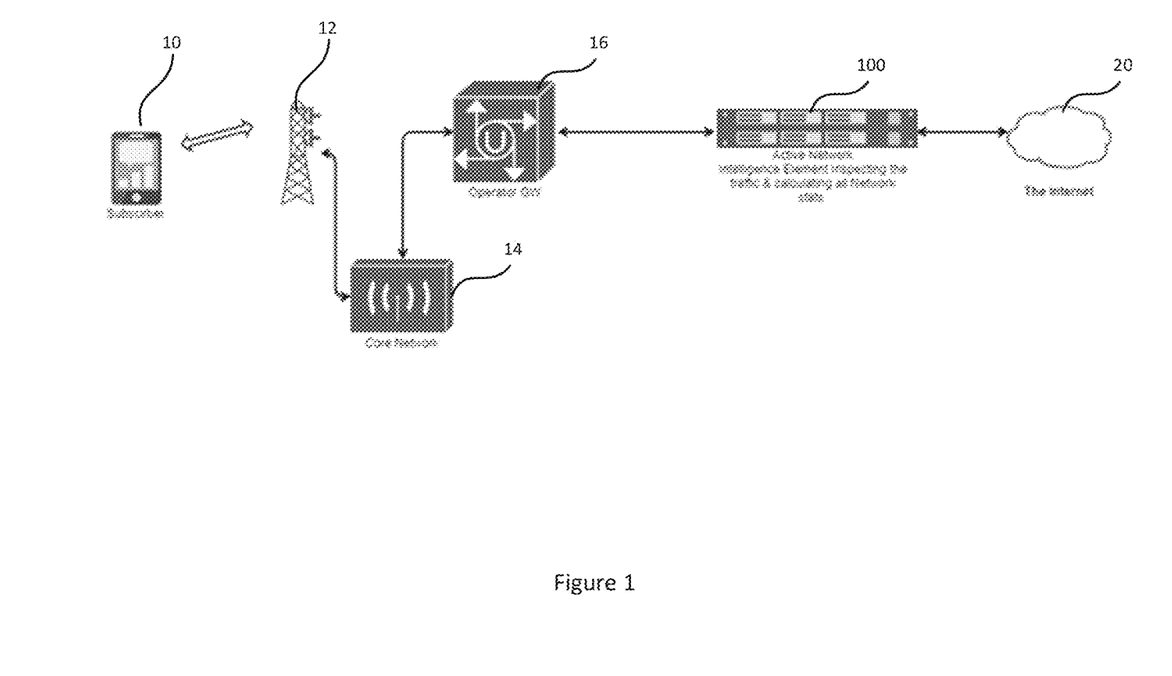
FIG. 1 illustrates an environment for computer network traffic over an operator network.

FIG. 1 illustrates an environment for an embodiment of the system. A subscriber, using a user device 10, may initiate a traffic flow with a base station 12. The traffic flow may be transmitted to and from a core network 14 from the base station. The traffic flow may be seen and directed by the operator network 16 and may be reviewed and classified by a system 100 for classifying obfuscated traffic. The system 100 may be included as a component of a network device which resides between the operator's gateway and the Internet 20. The system 100 is intended to reside within the operator's or Internet Service Provider's (ISP's) network 16. It will be understood that embodiments of the system and method detailed herein are intended to be employed over any type of computer network, for example, fixed line, mobile, satellite or other computer network.

Figure 2:
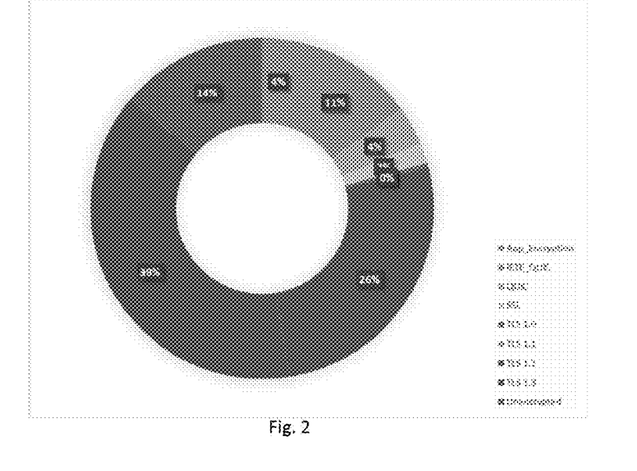
FIG. 2 illustrate a distribution of traffic types over internet traffic.

FIG. 2 illustrates a recent breakdown of internet traffic. As can been seen, QUIC (including IETF QUIC) consumes approximately 15% of all internet traffic. It has been noted that the same traffic parameters or traffic statistics are not attainable in a similar manner as Transmission Control Protocol (TCP) has been. Without visibility into the various traffic measurements, for example latency, the network provider, for example an internet service provider, is generally unable to determine knowledge of network quality and/or Quality of Experience (QoE). Without this insight, the network provider may not be able to determine when corrective traffic actions should be performed.

Calculating latency for User Datagram Protocol (UDP) is generally not considered to be possible at the UDP protocol level. UDP has 4 fields: source port, destination port, length of the payload and checksum. Using these 4 fields there is no ability to measure latency for UDP. Embodiments of the system and method provided herein are intended to provide a solution for calculating latency which involves UDP or IETF QUIC protocol and using the nature of the traffic to measure the latency of the traffic flow.

IETF QUIC Latency has previously been able to be calculated by either a client and/or Server. However, for a network device or network provider in the middle box in the network, it is generally not possible to identify a data packet and acknowledgement (ACK) packet. Without determining and identifying these data packets, conventional methods of determining latency have not been possible.

Latency has previously been calculated using for example, handshake packets or a TCP flow through the same server to determine a latency value for the server. However, latency is frequently used for detecting bad QoE of the flow whenever a deterioration of QoE occurs. If it is not possible to calculate latency throughout the life of the flow, handshake latency alone may not be a good indicator of QoE.

Figure 3:
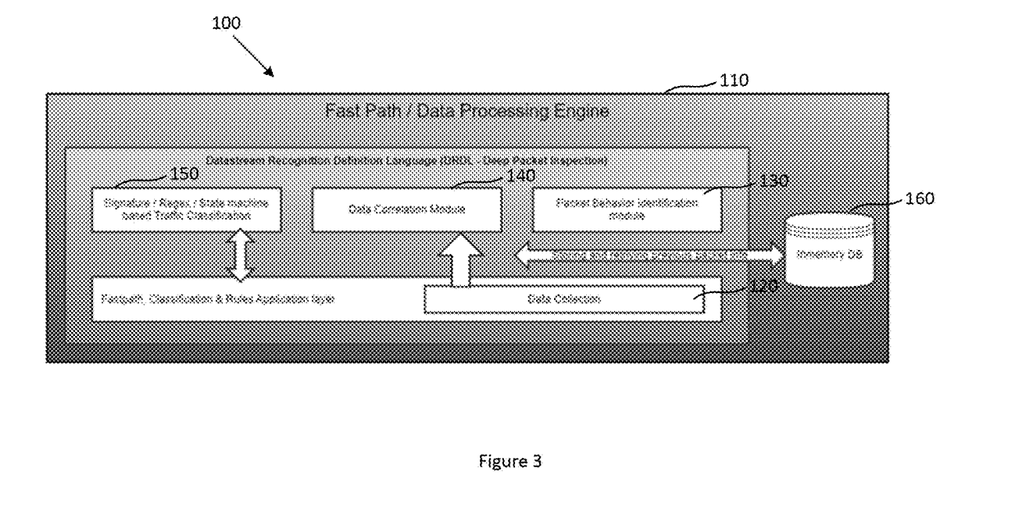
FIG. 3 illustrates an example embodiment of a system for measuring latency according to an embodiment.

FIG. 3 illustrates an embodiment of a system for determining latency for traffic flows. The system includes a data processing engine 110, a data collection module 120, a packet behavior identification module 130, a data correlation module 140, a traffic classification and state machine 150, and a memory component 160. The system further includes at least one processor and in some cases a plurality of processors. The system is generally intended to be distributed and reside in at least one network device on the data plane. The processor may be configured to execute the instructions stored in the memory component in order for the modules to execute their functions. The system 100 is intended to receive information from the computer network equipment that allows the system to determine traffic flow statistics and provide for traffic action instructions and traffic management rules for the network.

The data processing engine 110 is configured to receive and review traffic flows. The data processing engine may determine the type of flow and may provide further operations for flows identified as QUIC or IETF QUIC traffic flows.

The QUIC traffic flow may then be reviewed by the data collection module 120. The data collection module 120 is configured to determine parameters associated with the QUIC traffic flow. In particular, the data collection module 120 may determine, for example, the sender of the flow, the direction of the flow, the size of the packet, and other packet parameters.

The packet behavior identification module 130 is configured to identify and store or retrieve from the memory component identification factors for labelling or characterizing the packet. In some cases, the packet behavior identification module 130 may store or retrieve information regarding the predetermined size limit of an ACK packet, the full Maximum Transmission Unit (MTU) size for a payload packet and the like.

The data correlation module 140 is configured to correlate the packet behavior data received or retrieved from the packet behavior identification module 130 and the packet parameters collected from the data collection module 120. From this correlation, the data correlation module 140 is configured to identify the type of packet and provide a label to the packet.

The state machine 150 is configured to determine the latency of the QUIC traffic flow as detailed herein. The state machine 150 may further provide for corrective traffic actions if required based on the determined latency.

This embodiment of the system is configured to review a QUIC traffic flow, for example an IETF QUIC traffic flow, with a request and response mechanism and/or acknowledgement. It will be understood that in the QUIC protocol these messages are generally encrypted. The system is configured to differentiate between each packet on both sides of the traffic flow with different labels.

In some cases, the data processing engine may identify each new request and corresponding response as a new data stream. The packet behavior identification module may be configured to label packets within the new data stream. In particular, with data received by the data collection module, the packet behavior identification module may label, for example:

First full MTU size packet going out from the client side and/or server side is intended to be labeled as a start of the stream.
First packet of the stream is identified by, for example:
  i. First packet of the flow;
  ii. First packet after a predefined gap of packets in the same side;
  iii. First packet after a stream end type and/or labeled packet in either side of the stream (client/server side);
  iv. or the like
First and/or further ACK packet of the stream that may be identified by a small sized packet.
First small size packet received when the other side (Client or Server side) is sending full segment payloads. Additional ACK packets may be seen when the other side is still sending full segment payloads.
An end of stream packet: An end of stream packet may be identified after continuous packets of full MTU payloads, then receiving a packet with a smaller size payload within the same time difference of previous full MTU payloads. Receiving this end of stream packet indicates that the stream has finished communicating the payload.

In most cases, the first few IETF QUIC standard type packets show clear request and response types (Client Hello to Server Hello). These packets are used to calculate Handshake Latency. These states and/or labels may be used to correlate corresponding transmission and received data payloads and these payloads' approximate ACK packets.

Once a packet is correlated, a difference between one or more multiple data packets and ACK packets are used for latency calculation by the system to determine latency.

Embodiments of the system and method are configured to determine packet behavior data and correlate this behavior, including the size of the packet and the time to calculate latency for IETF QUIC. One of skill will understand that additional embodiments may include some or all of the features of the system described in relation to FIG. 3. Various modifications may be made by one of skill depending on the particular protocol in use.

Figure 4:
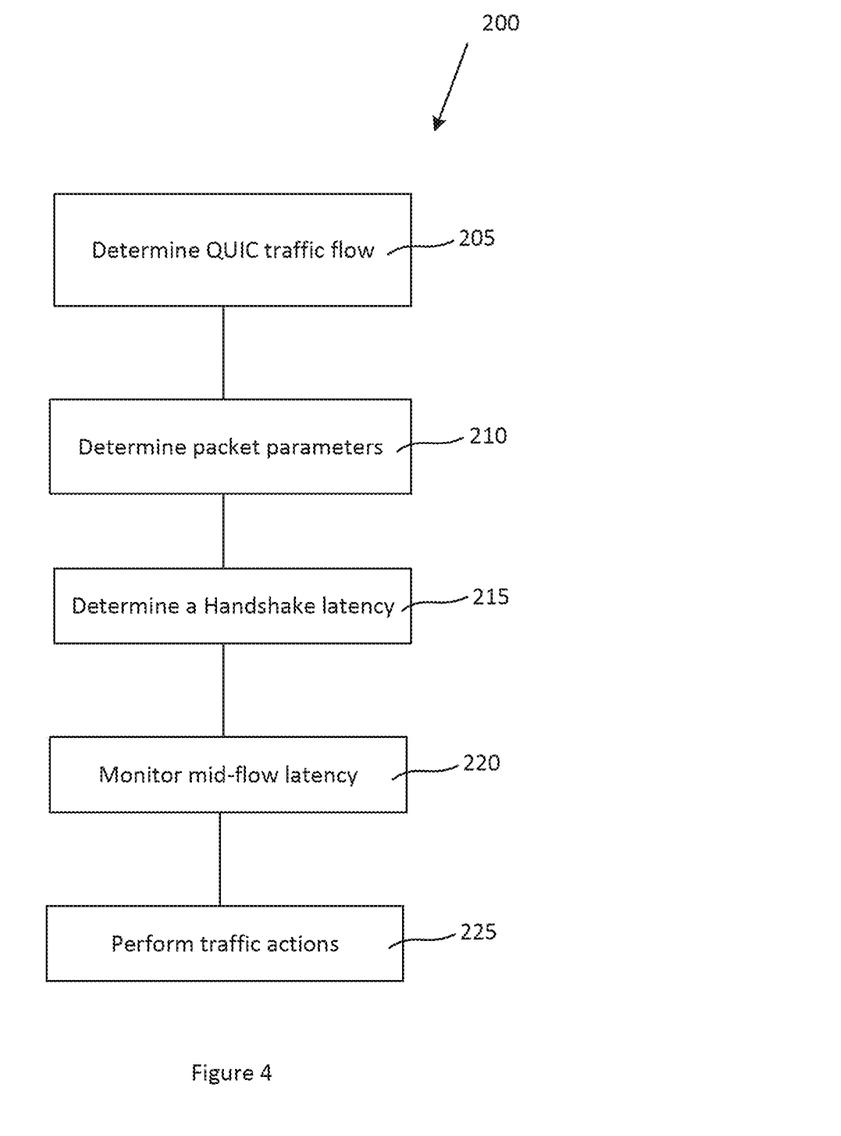
FIG. 4 illustrates an embodiment of a method for measuring latency.

FIG. 4 illustrates an example embodiment of a method for determining latency of a traffic flow and in particular a QUIC traffic flow. The method, at 205, determines if the type of traffic is an IETF QUIC or other QUIC traffic flow. The data collection method, at 210, determines packet parameters, for example, packet order, packet size and or few other parameters to identify a potential data segment/ACK packet (s) for the same data segments.

At 215, when a flow is started, an initial handshake latency may be calculated based on a known client side packet going from the client and an appropriate server side packet coming from the server. In many cases, this may be determined by a time difference between the Client Hello and the Server Hello. The same process can be used with the server side packets like Server Hello or QUIC Handshake and the packet's Response. The time difference is calculated as latency. The handshake latency may be determined once the data correlation module identifies the client side packet request or client hello and/or server hello based on the packet parameters and the known packet behavior stored in the packet behavior identification module.

At 220, the packet parameters of later packets are retrieved and correlated with the data correlation module and packet behavior identification module to monitor mid-flow latency as detailed herein. At 230, traffic actions, such as congestion management, may be provided by the state machine 150 which may improve the QoE when it is noted that latency is increasing or when latency is above a predetermined threshold.

Figure 5:
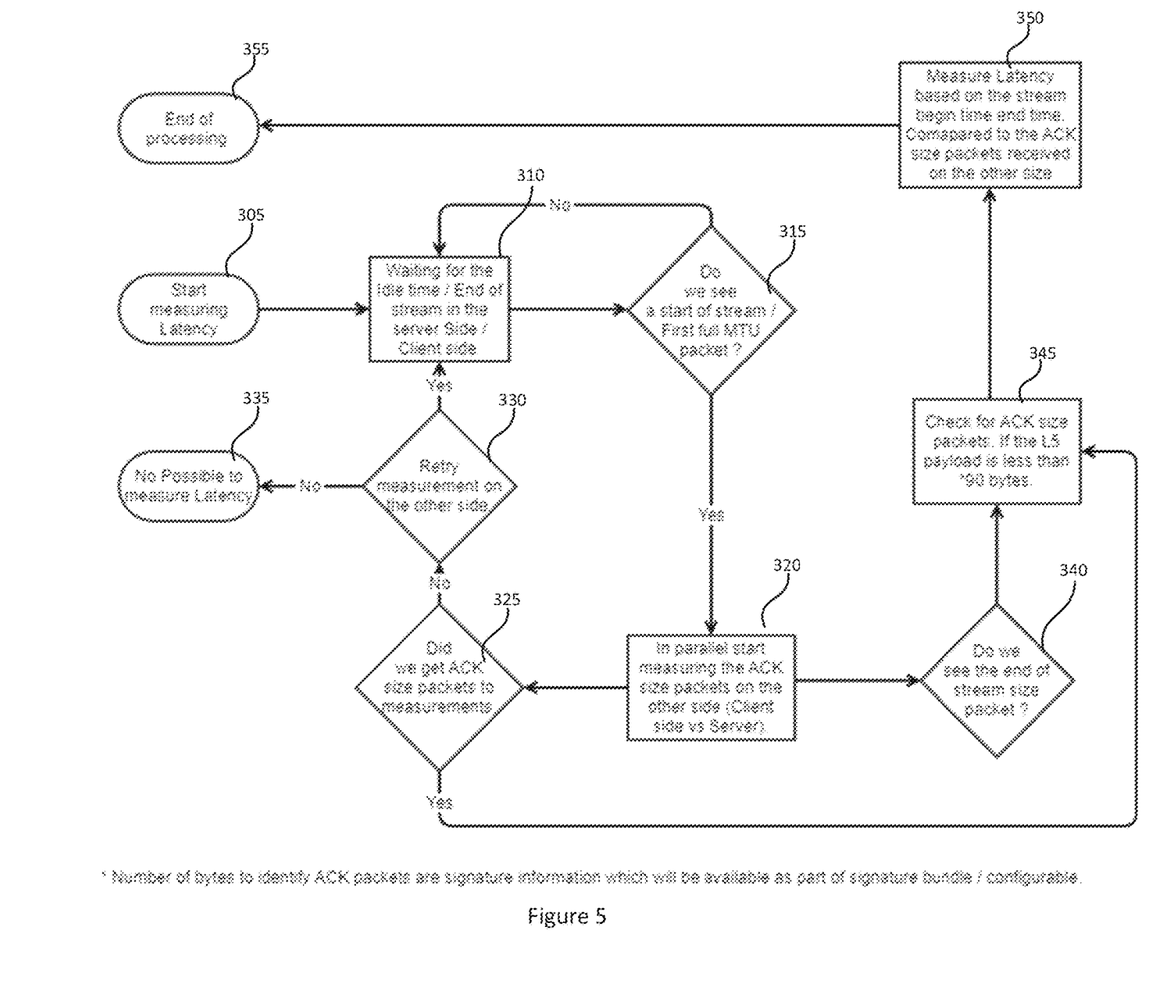
FIG. 5 illustrates a method for measuring mid-flow latency of QUIC traffic.

FIG. 5 is an example flow chart of an embodiment of a method for determining mid-flow latency. After determining an initial Handshake latency, mid flow latency is intended to be determined throughout the flow for every preconfigured interval. FIG. 5 illustrates a single interval determination that is intended to be repeated at each interval. In some cases, the preconfigured interval may be between 2 and 30 minutes. In some cases, the preconfigured interval may be a period of every 5, 10, 15 minutes or the like while the flow is being executed.

At 305, after the initial handshake latency has been determined, mid-flow latency determination may commence. At 310, the system waits for the idle time or end of stream from either the server side or client side.

At 315, the data collection module determines a first full MTU packet or the start of the stream as detailed herein, to identify the start of the stream. The data collection module may continue to wait, at 310, until such a full MTU packet is received. Once it is received, at 320, the data processing engine 110 is configured to start measuring the ACK size packets from the other side of the stream. Once a packet is received, it is determined whether the packet is appropriately sized to be an ACK packet, at 325. If it is not appropriately sized, the system may retry measurements from the other side or opposite direction, at 330. If both directions have been tried, it may not be possible to measure latency for this traffic flow, at 335. Otherwise, the loop may repeat for both directions.

Once an ACK has been determined, it may be determined whether an end of stream size packet has been reviewed, at 340. At 345, the ACK size is reviewed and determined if the payload is less than a particular predetermined size, for example, 90 bytes. In some cases, this predetermined size may be configured with any updates to the general size of an ACK packet. The predetermined size is intended to be large enough to include the ACK packets, but small enough that an end of stream packet would not be determined to be an ACK packet.

At 350, the latency is determined by the data correlation module 140 based on the stream begin and end time and compared to the ACK packets received by the other side.

At 355, the interval may be considered completed and the next interval can begin.

In a specific example, a client may initiate a handshake with a server. The system is configured to determine and identify different packet types and each packet's approximate size. Based on a standard payload size when one side is sending stream of bytes in fragmented chunks, the sender, in this case the client, would use full MTU size payload until the complete stream of bytes are sent across. Similarly, the ACK packets going from the other size of the stream would not carry any additional data until the current stream is completed. Based on different packet sizes, the system is able to label the packet to different type for a QUIC traffic flow.

In some cases, the system may determine the traffic types as, for example: Start of Stream, End of Stream, and ACK packet.

For a start of the stream packet: when a new stream has started sending data, the data collection module may determine the size of the packets to be full MTU size payload continuously or at least one packet carrying more data than an ACK packet size. In another case, the entire stream may be sent in only one packet. The data correlation module may correlate these packets to be start of stream or stream packets based on the data received from the data collection module and the known behavior from the packet behavior identification module.

For an end of stream packet: after one or a plurality of full MTU packets are seen from a single side (either client side or server side) if the data processing engine 110 determines that a packet has a less than MTU size payload, the packet could be an end of stream.

For an ACK packet, typically on the other side of the communications: the system is configured to determine whether the packet is a small sized packet seen on the other side of the stream when a current stream is communicating the payload.

The above are shown as examples only and there could be a plurality of various label types that could influence the determination of latency as used by embodiments of the system and method herein.

The system may further define rules to determine how the state-machine would function. In particular, knowing when the stream is starting to send bytes and when the stream is ending. By determining a start and end of the stream, the system is intended to determine which ACK is for approximately which payload stream.

The system may then correlate and determine latency of the stream. Based on the correlation, the system may be able to determine the time stamp of the data payload and the approximate corresponding ACK packet. As the system is intended to measure latency for the IETF QUIC based application, the system may then be able to take corrective action to improve the QoE.

Figure 6:
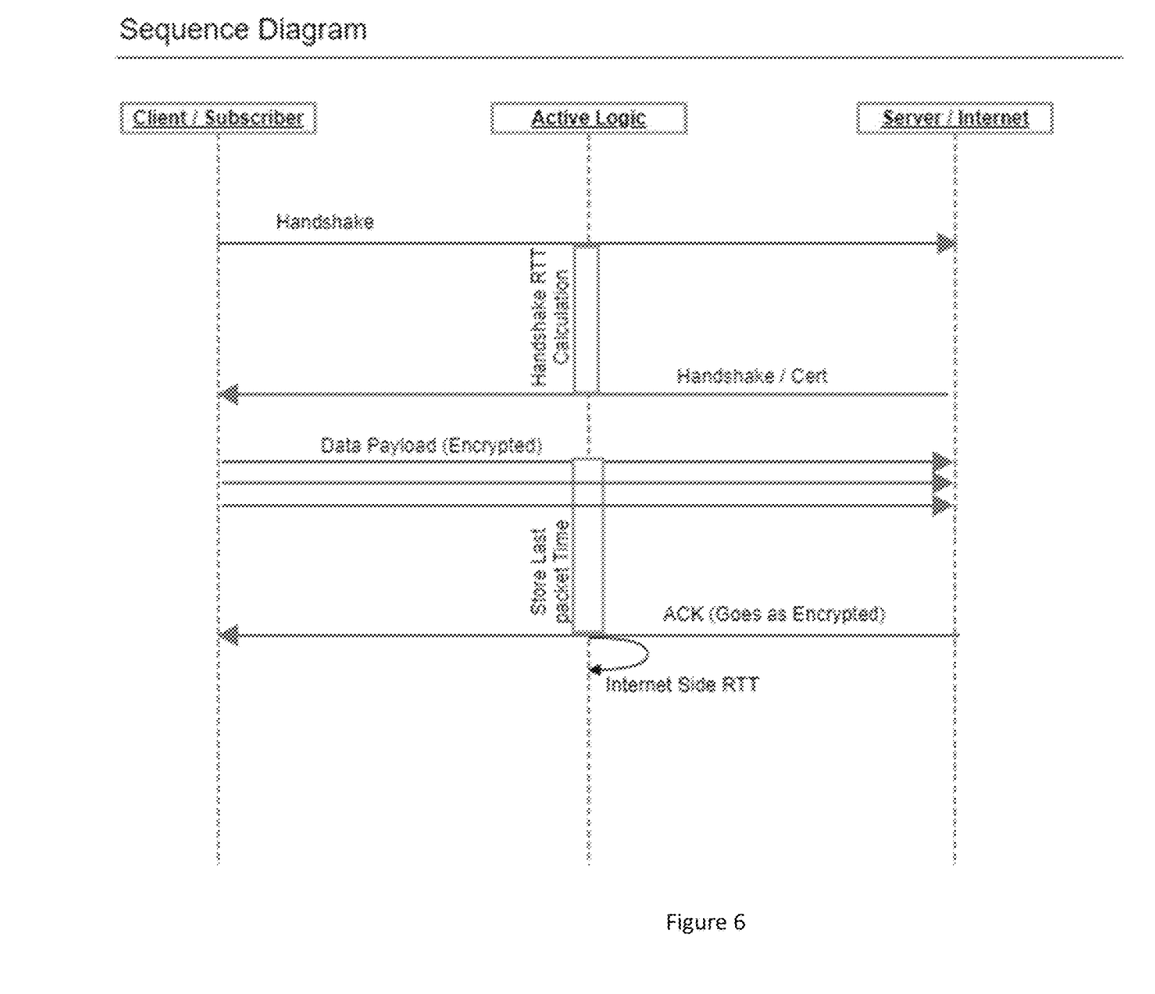
FIG. 6 is a sequence diagram of IETF QUIC traffic flows.

FIG. 6 provides a sequence which illustrates an example of how a latency can be calculated from the client side packet going to server side (other side). The system may determine the approximate packet size of different labels of packet based on the IETF QUIC standard.

It will be understood that embodiments of the system and method herein may be applicable to protocols that are similar to the QUIC protocol or have a basis in the UDP protocol, similar to the QUIC protocol. The term QUIC is intended to refer to and cover all such protocols.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for measuring latency on a computer network comprising:
    identifying a QUIC traffic flow;
    determining packet parameters associated with the QUIC traffic flow;
    determining a handshake latency associated with the packet parameters;
    monitoring mid-flow latency of the QUIC traffic flow, wherein mid-flow latency comprises latency of packets after the handshake;
    providing a traffic action to the QUIC traffic flow if the mid-flow latency exceeds a predetermined threshold.

2. The method according to claim 1, wherein the packet parameters comprise: the sender of the flow, the direction of the flow, and the size of the packet.

3. The method according to claim 1, wherein monitoring mid-flow latency comprises:
    determining a type of packet for a packet in the QUIC traffic flow;
    for a data payload packet determining an associated ACK packet; and
    correlate the data packet with the associated ACK packet to determine a mid-flow latency based on the traffic flow begin and end time.

4. The method according to claim 3, wherein the ACK packet is determined when a packet has a layer 5 payload less than a predetermined threshold.

5. The method according to claim 1, further comprising:
    determining a full Maximum Transmission Unit (MTU) for the traffic flow; and
    determining whether a packet of the traffic flow is a full MTU sized packet to determine if the packet is a data packet.

6. The method according to claim 5, wherein an end of stream packet is determined when a plurality of full MTU sized packets is followed by a packet of less than full MTU size.

7. The method according to claim 1, wherein the QUIC traffic flow is an IETF QUIC traffic flow.

8. A system for measuring latency on a computer network comprising:
    a processor;
    a memory comprising computer readable code, wherein the computer readable code, when executed by the processor, implements modules comprising:
    a data processing engine configured to determine a QUIC traffic flow;
    a data collection module configured to determine packet parameters associated with the QUIC traffic flow;
    a state machine configured to determine a handshake latency associated with the packet parameters and monitor mid-flow latency of the QUIC traffic flow, wherein mid-flow latency comprises latency of packets after the handshake and configured to provide a traffic action to the QUIC traffic flow if the mid-flow latency exceeds a predetermined threshold.

9. The system according to claim 8, wherein the data collection module is configured to determine packet parameters comprising: the sender of the flow, the direction of the flow, and the size of the packet.

10. The system according to claim 8, wherein the state machine is configured to:
    determine a type of packet for a packet in the QUIC traffic flow;
    for a data packet determine an associated ACK packet; and
    correlate the data packet with the associated ACK packet to determine a mid-flow latency.

11. The system according to claim 10, wherein the ACK packet is determined when a packet has a layer 5 payload less than a predetermined threshold.

12. The system according to claim 10, further comprising a packet behavior identification module configured to:

determine a full Maximum Transmission Unit (MTU) for the traffic flow; and determining whether a packet of the traffic flow is a full MTU sized packet to determine if the packet is a data packet.

13. The system according to claim 12, wherein an end of stream packet is determined when a plurality of full MTU sized packets is followed by a packet of less than full MTU size.

14. The system according to claim 10, wherein the QUIC traffic flow is an IETF QUIC traffic flow.

* * * * *